Dec. 13, 1960  C. E. EISENMANN ET AL  2,963,979
PORCELAIN LINED CENTRIFUGAL PUMPS
Filed Jan. 13, 1958  2 Sheets-Sheet 1

INVENTORS
CHARLES E. EISENMANN
CLARENCE A. BROOKS
JOSEPH J. NEMETH
STEPHEN KATRANSKY
BY Greene, Pisiello & Durr
ATTORNEYS Dec. 13, 1960

C. E. EISENMANN ET AL 2,963,979

PORCELAIN LINED CENTRIFUGAL PUMPS

Filed Jan. 13, 1958

INVENTORS
CHARLES E. EISENMANN
CLARENCE A. BROOKS
JOSEPH J. NEMETH
STEPHEN KATRANSKY

BY Greene, Pineles & Durr

ATTORNEYS (2,963,979)

PORCELAIN LINED CENTRIFUGAL PUMPS

Charles E. Eisenmann, Fords, Clarence A. Brooks, South Amboy, Stephen Katransky, Fords, and Joseph J. Nemeth, Metuchen, all in New Jersey, assignors, by mesne assignments, to Indiana General Corporation, a corporation of Indiana Filed Jan. 13, 1958, Ser. No. 708,539

4 Claims. (Cl. 103—103)

This invention relates to centrifugal pumps adapted to transport corrosive fluids and more particularly it relates to an attachment for such pumps, which is adapted to remove particles from the corrosive fluid being transported.

Centrifugal pumps of this type for transporting corrosive fluids are completely lined or coated on their inside, liquid-contacting surfaces with an inert ceramic material such as porcelain. Thus, the impeller may be made of glazed porcelain with internal steel reinforcing and the internal chamber of the pump is also lined with a corrosion resistant material such as porcelain. The corrosion protective parts or linings are substantially inert to the corrosive action of the acids, alkalies, or similar corrosive liquids but on the other hand these parts are more brittle than metals and are capable of being cracked by solid particles which sometimes get into the liquid being transported. For example, bolts or nuts or remnants thereof are frequently entrained in said liquids.

Among the objects of this invention is to provide a protective ceramic screen device which removes large solid particles which are capable of inuring the ceramic impeller or lining of a centrifugal pump from the liquid to be transported by the centrifugal pump.

Figure 1:
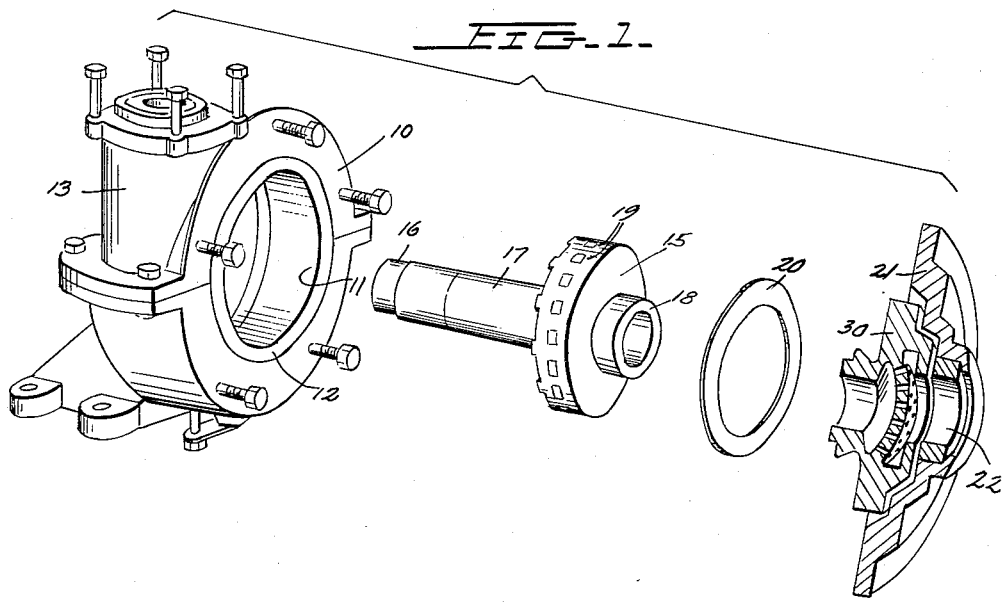
Fig. 1 is an exploded view of a centrifugal pump device partly in cross section to show the strainer device of the invention.

The centrifugal pump of Fig. 1 shows a casing 10 with an inner chamber 11 having a lining 12 of porcelain or porcelain coating material. Adapted to rotate in the chamber 11 is the impeller 15, mounted on shaft 16. The impeller 15 is formed of steel reinforced porcelain and the portion 17 of the shaft 16 which extends within the chamber 11 when the pump is assembled is made of or is coated or covered with porcelain or similar chemically resistant ceramic material. The hollow tube 18 extending in the opposite direction with respect to the shaft 16, 17 is an integral part of the impeller and is also of steel reinforced porcelain. Tube 18 provides the entrance to the impeller for the liquid to be transported.

Suitable gaskets 20 (only one shown) are included to seal the various parts together. Such gaskets may be made of polymers of tetrafluorethylene or trifluormonochlorethylene ("Teflon" or "Kel-F," for example) or of carbon. The end plate 21 closes the side of chamber 11, serves to align the parts, and holds the strainer device 30 (or 30') of the invention in nested position therein.

The strainer device 30 has on its inner end, a tube section 31 with a shouldered flange 32 on the outside thereof adapted to limit the movement of tube 18 over the end 31. The central part of the strainer device comprises a disk-like flange 33 adapted to position the device in end plate 21. Extending from the front of the flange 33 is a circular box-like member 34 with an opening 35 in the central portion thereof. Within the box-like member 34 is the spherically shaped strainer plate 36. The strainer 36 is convex from the outside or with respect to the direction of flow of fluid. The entire strainer device 30 is made of ceramic material such as porcelain and has relatively thick wall sections. The spherical configuration of the strainer means 36 provides it with additional strength so that it is capable of resisting the impact of the fluid being transported or of suspended matter within said fluid. The size of the openings 37 in the strainer portion 36 may be varied depending on the type of suspended matter which it is desired to prevent from passing through the pump.

Figures 2, 3:
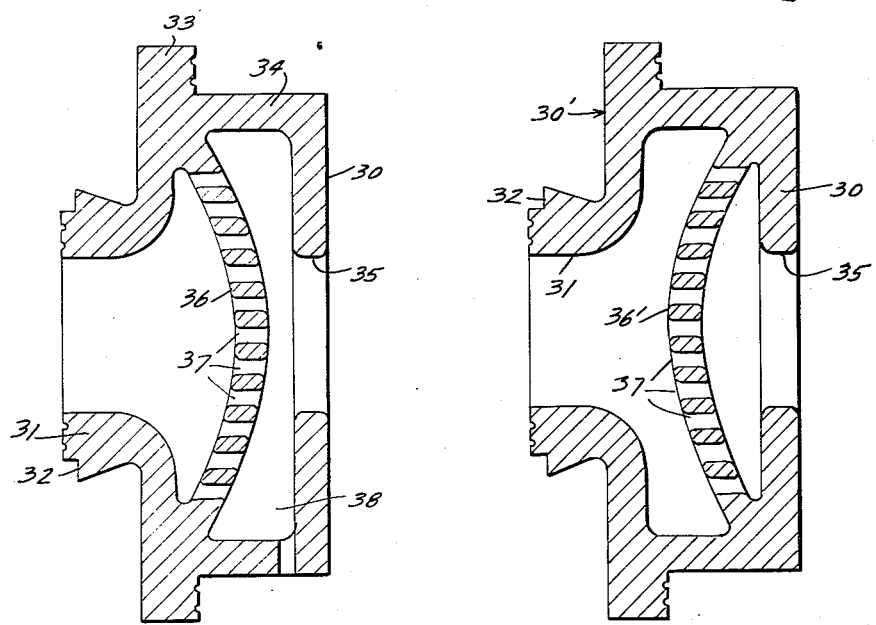
Fig. 2 is an enlarged detail cross sectional view of the strainer device shown in Fig. 1.
Fig. 3 is a view similar to Fig. 2 but showing a modified form of strainer device.
Figure 4:
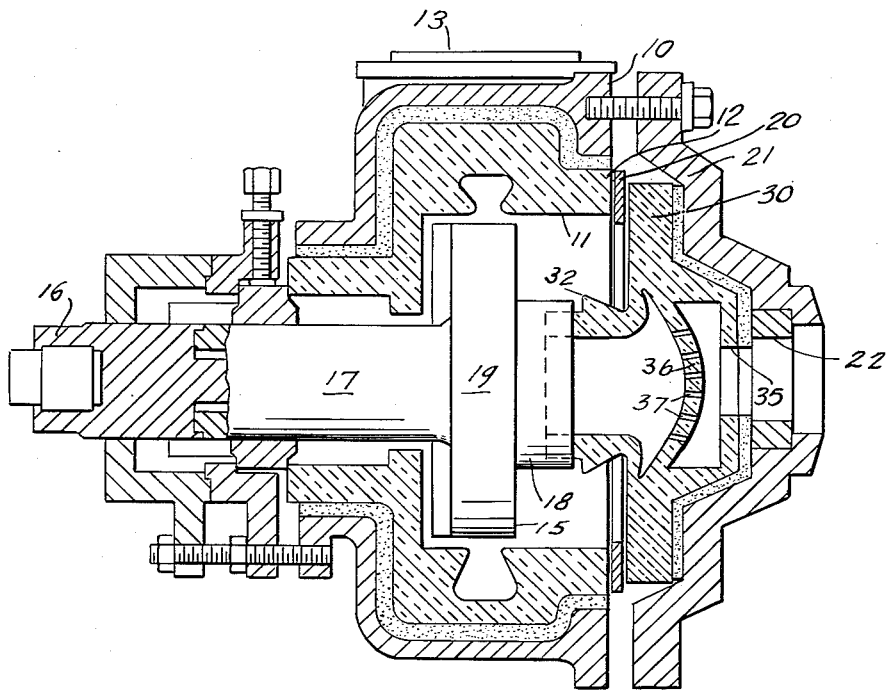
Fig. 4 is a side cross sectional view of a centrifugal pump incorporating the strainer device of Fig. 2.

In the modified form of strainer device 30' the strainer plate 36' is concave in configuration. Substantially the same additional strength is obtained by the strainer 36' as by strainer plate 36 although in the device shown in Figs. 1 and 2 there is a greater space 38 available between the plate 38 and the outside of box 34 for the collecting of particles which are caught by and fall from the plate 36.

In the operation of the centrifugal pump of the invention, the liquid to be transported, enters the pump from a conduit connected to the opening 22 of plate 20, passes through tube 18, out orifices 19 of impeller 15 into chamber 11 and thence passes through exit pipe 13 of casing 10. Any heavy suspended particles are strained from the liquid by strainer plate 36 or 36' before entering the impeller 15.

The features and principles underlying the invention described above in connection with specific exemplifications will suggest to those skilled in the art many other modifications thereof. It is accordingly desired that the appended claims shall not be limited to any specific feature or details thereof.

We claim:

1. In a centrifugal pump of the type comprising a rotatable impeller formed with at least a surface coating of corrosion resistant ceramic material and having an axial opening at a first side for admitting fluid to be transported and a ceramically-lined casing surrounding said impeller forming a chamber therebetween, a removable side-closing plate for said casing adapted to close said casing at the side adjacent to the axial opening in said impeller, said plate having an opening in alignment with said opening in the impeller, the improvement comprising a strainer device positioned between the impeller and said side-closing plate, said strainer device having an internal chamber which is larger in diameter than the axial opening in said impeller, said strainer device having tubular means at the first side adjacent said impeller with an extension adapted to extend into said axial opening of the impeller, a flange spaced from the end of the extension on said tubular means of the strainer device adapted to abut against the edge of the opening in said impeller to hold the strainer device in fixed position with respect to the impeller, flange means on the side opposite said first side of said strainer device adapted to hold the latter in fixed position with respect to said side closing plate, said strainer device comprising a strainer plate in the intermediate portion thereof having a spherical curvature, said strainer plate being concentric with said axial opening of the impeller and of larger diameter than the latter.

2. A device as claimed in claim 1 wherein the strainer plate is convex with respect to the entrance side of said pump.

3. A device as claimed in claim 1 wherein the strainer plate is concave, with respect to the entrance side of said pump.

4. A device as claimed in claim 2 wherein said convex strainer plate is surrounded on its sides by a circular box-like structure.

References Cited in the file of this patent

UNITED STATES PATENTS

| | | |
|---|---|---|
| 2,091,492 | Russell | Aug. 31, 1937 |
| 2,107,260 | Ihara | Feb. 1, 1938 |
| 2,466,812 | Jacobsen | Apr. 2, 1949 |

FOREIGN PATENTS

| | | |
|---|---|---|
| 114,366 | Great Britain | Apr. 4, 1918 |
| 476,207 | Germany | May 13, 1929 |
| 584,395 | Great Britain | Jan. 14, 1947 |